United States Patent
Burghardt et al.

(10) Patent No.: US 11,250,228 B2
(45) Date of Patent: Feb. 15, 2022

(54) READING OF OPTICAL CODES

(71) Applicant: SICK AG, Waldkirch (DE)

(72) Inventors: Sascha Burghardt, Waldkirch (DE); Jean Stawiaski, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/158,296

(22) Filed: Jan. 26, 2021

(65) Prior Publication Data

US 2021/0232786 A1    Jul. 29, 2021

(30) Foreign Application Priority Data

Jan. 27, 2020   (EP) .................................... 20153885

(51) Int. Cl.
  *G06K 7/14*   (2006.01)
  *G06T 7/70*   (2017.01)
  *G06K 9/32*   (2006.01)

(52) U.S. Cl.
  CPC ......... *G06K 7/1417* (2013.01); *G06K 7/1413* (2013.01); *G06K 9/3233* (2013.01); *G06T 7/70* (2017.01)

(58) Field of Classification Search
  CPC .. G06K 7/1417; G06K 7/1413; G06K 9/3233; G06K 7/10722; G06K 7/146; G06T 7/70
  See application file for complete search history.

(56) References Cited

U.S. PATENT DOCUMENTS

| 6,814,291 B1 * | 11/2004 | Cordery .................. G06K 7/14 235/462.01 |
| 7,878,402 B2 | 2/2011 | Ye et al. |
| 8,235,296 B2 | 8/2012 | Idaka |

FOREIGN PATENT DOCUMENTS

| EP | 0736835 A2 | 10/1996 |
| EP | 2843616 A1 | 3/2015 |
| EP | 3163497 A1 | 5/2017 |
| EP | 3309703 A1 | 4/2018 |

OTHER PUBLICATIONS

K. Nakamura, H. Kawasaki and S. Ono, "Agent-based two-dimensional barcode decoding robust against non-uniform geometric distortion," 2015 7th International Conference of Soft Computing and Pattern Recognition (SoCPaR), 2015, pp. 181-186, doi: 10.1109/SOCPAR.2015.7492804. (Year: 2015).*

* cited by examiner

*Primary Examiner* — Matthew Mikels
(74) *Attorney, Agent, or Firm* — Nath, Goldberg & Meyer; Jerald L. Meyer

(57) ABSTRACT

A method for reading optical codes (12) with distortions caused by an uneven background of the code (12), the method comprising the steps of acquiring image data including the code (12), locating a region including the code (12) in the image data, and reading the code content of the code (12) from image data in the region, wherein the code (12) is read from image data at sampling points arranged in a sampling pattern corresponding to the distortions.

19 Claims, 5 Drawing Sheets

READING OF OPTICAL CODES

Figure 1:
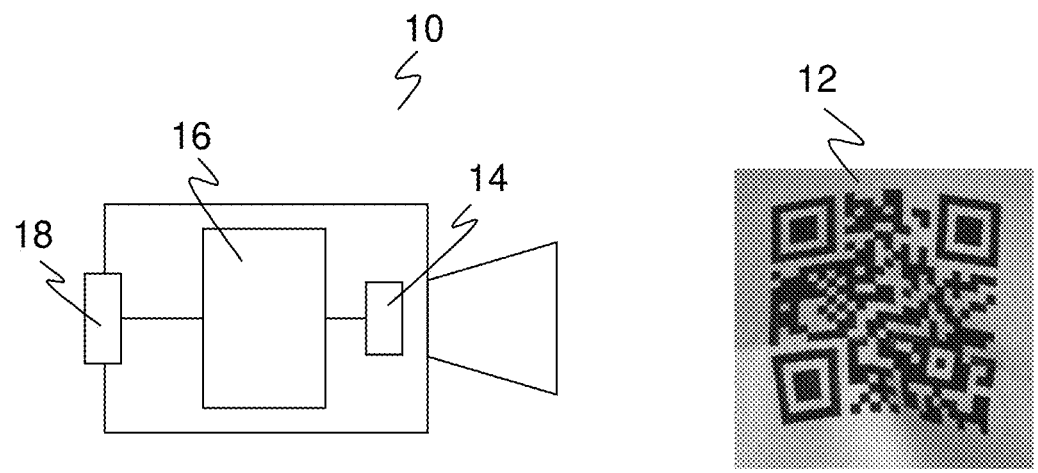

The invention relates to a method and a code reading apparatus for reading optical codes with distortions caused by an uneven background of the code.

Code readers are well known from supermarket checkouts, automatic package identification, sorting of mail, baggage handling in airports and other logistics applications. In a code scanner, a reading beam is guided across the code by a rotating mirror or a polygon mirror wheel. A camera-based code reader uses an image sensor to take images of the objects bearing the codes, and image processing software extracts the code information from these images. Camera-based code readers can easily handle code types other than one-dimensional bar codes, which are also two-dimensional like a matrix code and provide more information.

In an important application group, the objects bearing the codes are conveyed past the code reader. A code scanner detects the codes that are moved into its reading range one after the other. Alternatively, in a camera-based code reader, images of the objects are acquired, either by a matrix camera or by a line camera successively and line by line with the relative movement. Image data of a matrix or two-dimensional image sensor can have more or less overlap depending on the recording frequency and conveyor speed.

In order that the objects can be arranged on the conveyor in any orientation, a plurality of code readers often are provided on a reading tunnel to detect objects from several or all sides. It is also known to combine the reading fields of a plurality of code readers, for example to cover a broad conveyor belt.

In many cases, code images are distorted. One reason is that the codes are attached to or printed on non-planar surfaces. This can result in kinks, curvatures and ultimately completely random geometric distortions. This problem occurs regardless of the way the codes are generated, be it by printing, embossing code marks, attaching code labels, or any other method.

Error correction mechanisms are built into the various 2D code specifications. However, they are not designed in a way that complex deformations can be detected. Rather, a non-planar surface is implicitly assumed to have only a small influence. There are applications where this silent precondition is not fulfilled in more than some cases. A typical example are codes on soft packaging like plastic covers. Here, the existing mechanisms, such as a Reed-Solomon error correction, quickly reach their limits, and from a certain deformation the 2D codes are no longer readable.

Conventionally, there are approaches to rectify the acquired image of the code prior to the actual code reading. However, this does not relate to the actual code and its background, but for example is a correction of imaging errors of the code reader or a transformation of the imaging perspective. U.S. Pat. No. 7,878,402 B2 or EP 2 843 616 A1 describe such a perspective transformation. There is still the assumption that the code in itself is flat and merely acquired from an oblique perspective. Individual geometric distortions within the codes therefore continue to cause reading errors. U.S. Pat. No. 8,235,296 B2 is about a complementary application of writing a code on a curved surface. For this purpose, however, the 3D surface is detected, which requires considerable effort. Moreover, this only works for certain regular geometries, such as a cylinder, and certainly not for deformations that change constantly, as in the case of a soft surface.

Another conventional approach is to detect a global geometric structure of a code to be read, for example by means of a convex envelope. In some cases of small and in particular regular distortions this is a possibility, but if, for example, a wrinkled plastic cover is used as a background, the global geometry simply contains too little information, and reading the code continues to fail.

It is therefore an object of the invention to provide an improved method for reading a distorted optical code.

This object is satisfied by a method for reading optical codes with distortions caused by an uneven background of the code, the method comprising the steps of acquiring image data including the code, locating a region including the code in the image data, and reading the code content of the code from image data in the region, wherein the code is read from image data at sampling points arranged in a sampling pattern corresponding to the distortions.

The object is also satisfied by a code reading apparatus for reading optical codes with distortions caused by an uneven background of the code, the code reading device comprising an image sensor for acquiring image data including the code and a control and evaluation unit which is configured to locate a region including the code in the image data and to read the code content of the code from image data in the region at sampling points arranged in a sampling pattern corresponding to the distortions.

The codes are distorted by their non-planar, curved or deformed background, i.e. the surface where they are attached or printed, the deformation being kinks, curvatures or other geometrical properties, and the codes are therefore more difficult or impossible to read by conventional methods. The optical code is in particular a two-dimensional code according to any of the various known standards. Image data is generated which contains the code and is preferably at least roughly segmented and thus tailored to the code region. Image data are typically acquired by an image sensor of a camera-based code reader, although in principle a code scanner can also acquire an intensity profile line by line and thus generate image data. The code is read with a decoding method known per se. Throughout this specification, the terms preferably or preferred relate to advantageous, but completely optional features.

The invention starts from the basic idea of generating a sampling pattern or sampling grid of sampling points before the actual reading of the code, the sampling pattern being adapted to the deformations of the background of the code. Image data at these sampling points are used for code reading. The sampling pattern is therefore not a regular grid, but at least approximately as distorted as the code itself.

The invention has the advantage that the sampling pattern maps the deformation or distortion and thus compensates for it. The code can still be read, even if the deformation is strong and irregular, thus increasing the reading rate. Of course there are limits, for example when codes are folded in such a way that entire areas are covered. The method is applicable for different types of codes. Even in demanding applications, such as foil packaging, a high reading rate is achieved.

The sampling pattern preferably is determined without knowledge of the curvature of the uneven background. No further information is available apart from the image data, in particular no three-dimensional contour measurement. The geometry to be corrected is initially unknown and is also, in itself, not determined by the method according to the invention. Instead, the sampling pattern adapts locally to the distorted code.

Preferably, at least one of a module size of the code and a size of the required sampling pattern is determined from a finder pattern. A finder pattern is a part of a 2D code with a specific pattern that enables detection of the 2D code and certain properties thereof. Which code elements or modules the finder pattern has is therefore known from the code specification, and thus the module size in any specific acquired code can be determined from the finder pattern. By extrapolating to the acquired code region, it is also possible to deduce how many sampling points the sampling pattern needs to have in order to cover the code. A QR Code in addition provides the distance between its finder patterns, while a DataMatrix Code has a finder pattern completely framing the code from two sides, and that kind of information can additionally be used to find out about the required size of the sampling pattern.

The sampling pattern preferably comprises one sampling point per module of the code. There should be at least one sampling point per module, otherwise some modules are not represented at all. Conversely, one sampling point is also sufficient, because apart from its 2D position, each module carries only the light-dark information, which is completely captured by a sampling point in a representative position. A sampling pattern with at least one sampling point per module is therefore sufficient, a sampling pattern with exactly one sampling point even an optimal, still complete configuration without unnecessary effort.

The sampling pattern is preferably iteratively grown starting from a finder pattern until it covers the code. The finder pattern can reliably be located. Then, from this initial small pattern, the entire pattern is built up by stepwise enlargement ("grid growing").

Preferably, sampling points of the sampling pattern are initially defined for the finder pattern, in particular with the sampling points still in regular arrangement according to a flat background. Because of its specified structure, it is known for the finder pattern which modules it contains. A start of the sampling pattern therefore can be set and adjusted very reliably. For example, a finder pattern of a QR Code contains 7×7 modules consisting of rectangles arranged one inside the other. Accordingly, the starting point can be a pattern of 7×7 sampling points. During initialization, a regular sampling pattern is preferably used first, since no information about the distortions is known a priori.

The sampling points are preferably shifted towards the center of the module they represent. With a non-distorted, plane code, this could very easily be done by general centering of a regular sampling pattern with constant distance between the sampling points according to the estimated module size. For adaptation to an uneven background or surface, the sampling points are shifted individually to compensate for the respective local distortion. The center does not necessarily have to be the exact geometrical center of a module, it is only a matter of reliably avoiding the edges between the modules so that the sampling point captures a brightness value representative for the module.

A gradient image and a magnitude image of the code are preferably calculated to determine whether a respective sampling point is located in a local extremum on the basis of the magnitude image and to determine the direction of any remaining displacement from the local extremum from the gradient image. The gradient, as usual, is the first derivative of the 2D brightness function that the image data represents. The gradient, which is a vector, is decomposed into its direction in the gradient image and its magnitude in the magnitude image. Hence, gradient image is an abbreviation, since it does not contain the entire gradient information, but rather is a gradient direction image. In a specific and preferred example, one image can be determined for the magnitude and one image each for the gradient in X- and Y-direction. In this context, image is a term for any representation of the gradient. It is sufficient to perform this gradient calculation only once for the image data of the code region, the result can then be used in all iterations and for all sampling points. A sampling point is considered to be sufficiently centered in its module if the magnitude indicates a local extremum, in other words, if the magnitude is at least close to zero. This is a mathematical formulation of the fact that the sampling point is sufficiently far away from edges between the modules and thus is located somewhere amidst the light or dark area of the module. The gradient image shows the direction where the local extremum is located when the magnitude condition is not yet fulfilled.

Sampling points are preferably shifted in steps smaller than a module size until a local extremum is reached, the shift would lead out of a module, or a maximum number of steps has been reached. In particular, there is no shifting of a respective sampling point if no local extremum could be found. It is searched for the local extremum by an iterative method. The step size is chosen small, so that no wrong local extremum is found in a neighbor module, which otherwise could happen in particular with several neighboring bright or dark modules. If a shift leads farther than the estimated module size, the method is aborted. If that happens, it is preferably not continued with the shift that has been determined so far, which probably does not represent a useful result, but this sampling point is not shifted at all for the time being.

A shift matrix of shifts of the respective sampling points towards a local extremum preferably is smoothed, in particular with a Gaussian filter. Shifts for the individual sampling points are determined and stored in the shift matrix. As just explained, no suitable displacement is found for some sampling points, and they remain in their initial position. By smoothing the shift matrix, not only are shifts that could positively be determined matched to one another to a certain extent, but also those sampling points are shifted via their neighbors that otherwise would have remained in their initial position.

Preferably, a new shift matrix with shifts of sampling points towards a local extremum is determined iteratively and applied to the sampling pattern until a further shift matrix does not cause any more shifts above a tolerance threshold or until a maximum number of iterations is reached. The shifts are repeated until the method converges and no more improvements are achieved. As a precaution there should be a termination condition after a certain number of steps, which is meant to include other similar predefined external conditions like the expiration of a maximum available computing time.

The sampling pattern preferably is iteratively grown at at least one edge with additional sampling points until it at least one of covers the code and reaches a predetermined size. Preferably, the sampling pattern grows by one column and/or row per iteration. It is conceivable to add several lines or columns at once, but if the local curvature varies strongly, this will worsen the adaptation. After the sampling pattern has grown in this way, the added sampling points, all sampling points, or an intermediate set, like the added sampling points and their neighbors from the already existing sampling pattern, are preferably subjected to the described adaptation for centering in their respective modules. The growing and thus the method for generating the adapted sampling pattern is finished when the code is covered. This is determined in particular by estimating the required size of the sampling pattern based on the size of the code region and the estimated module size.

If several of the steps as presented are implemented in combination, it should be noted that this is a multiple nested iteration. The higher level iteration starts with a small sampling pattern preferably at a finder pattern and grows it successively over the code region. For a respective adaptation, a shift matrix is determined and iteratively applied several times. A third iteration level can be added within the determination of a shift matrix, which tries to shift a respective sampling point stepwise to the center of its module to obtain an individual entry in the shift matrix.

A further sampling pattern preferably is determined starting from another finder pattern. This of course is only possible for code types like QR Code where several finder patterns are provided. For other code types, it is alternatively possible to try to grow the sampling pattern from an area which is not a finder pattern, but whose modules are clearly detectable in an earlier reading attempt or by image processing. This enables to make additional reading attempts if for some reason the finder pattern that was used in an earlier attempt has not been a good starting point.

Figure 2:
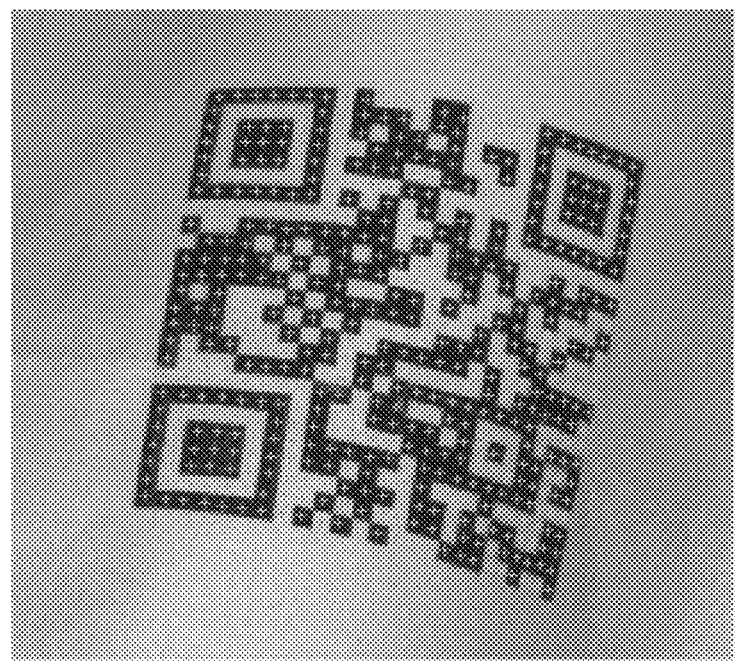
Figure 3:
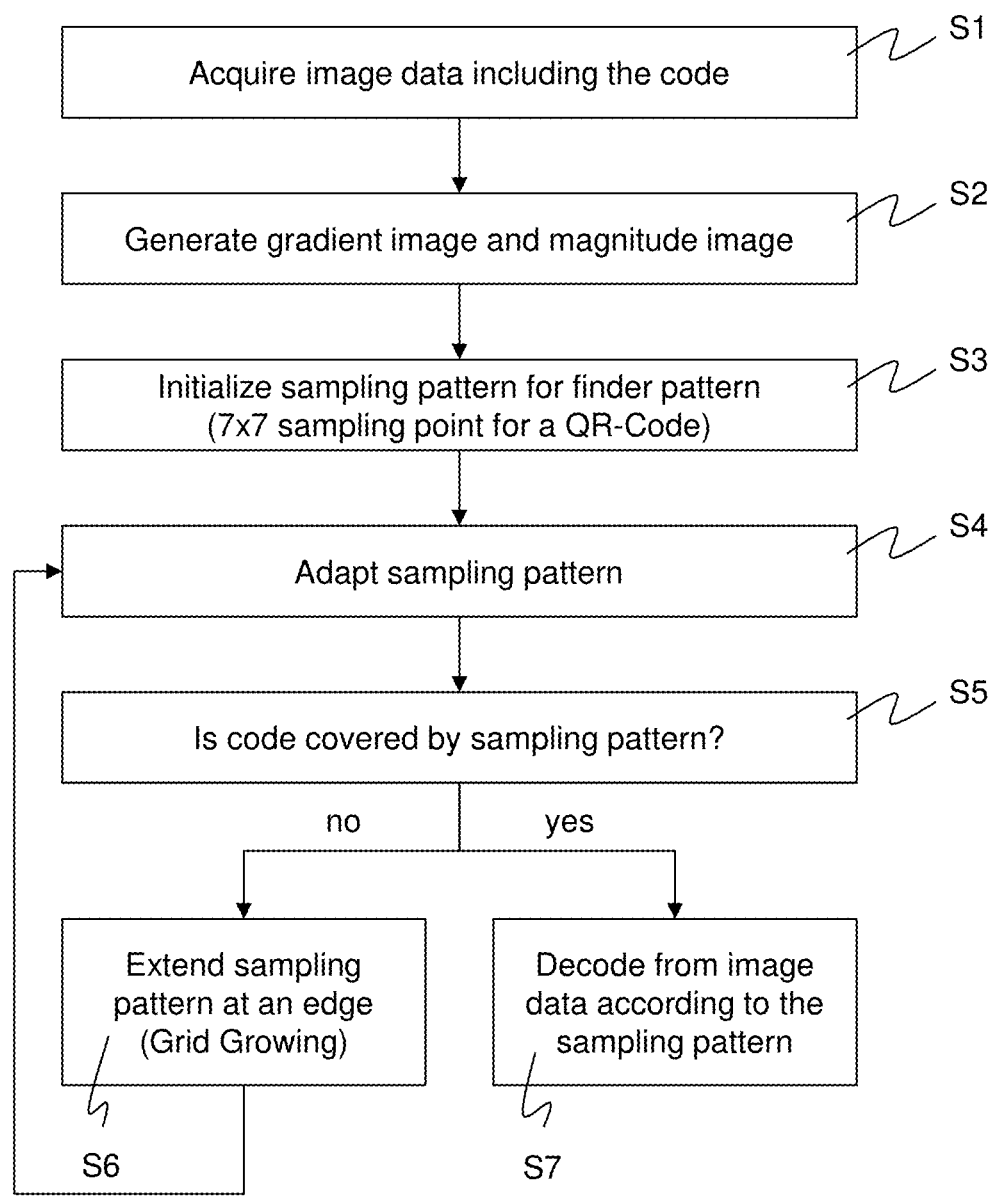
Figure 4:
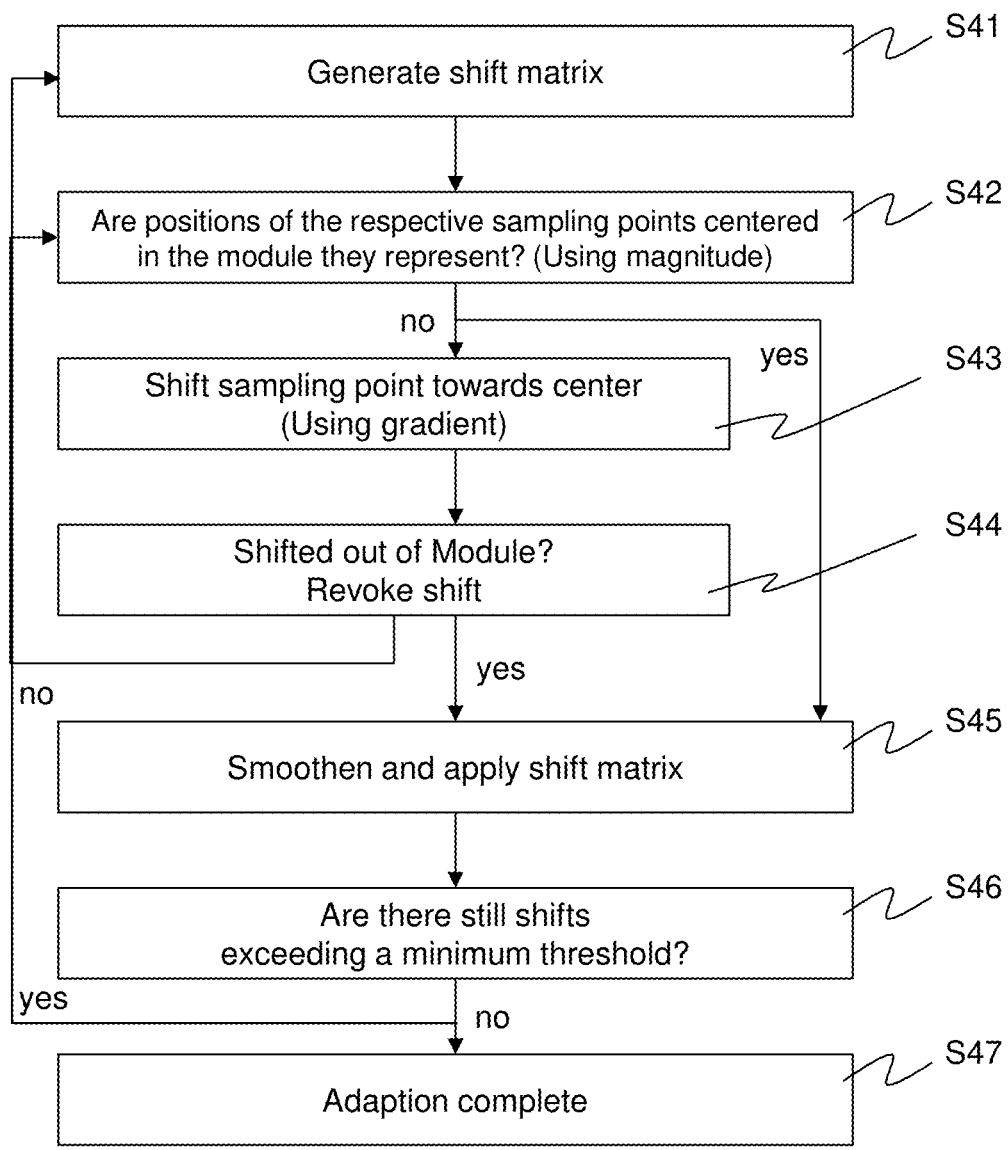
Figure 5:
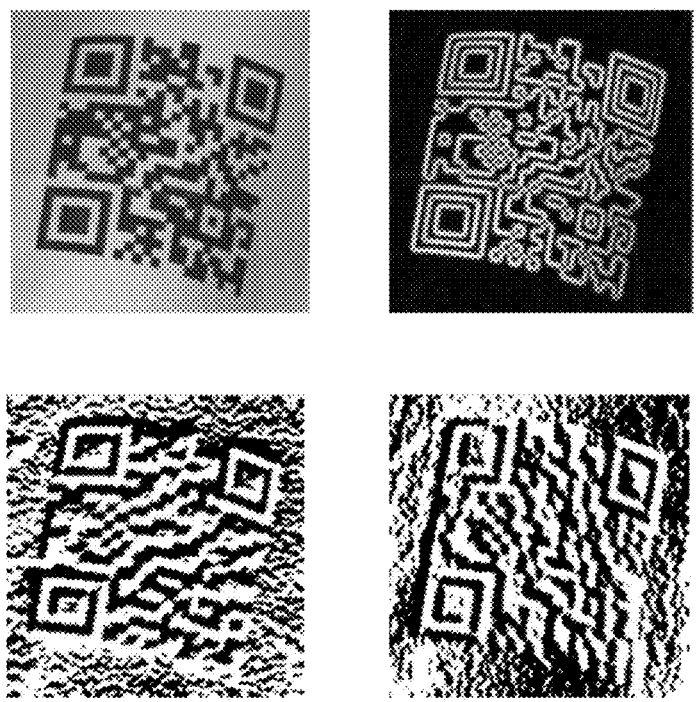
Figure 6:
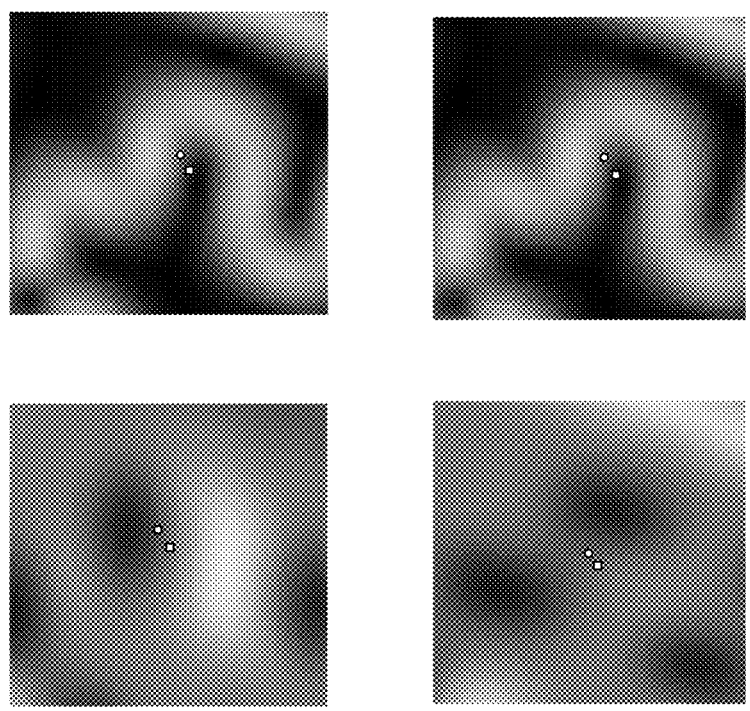

The invention will be explained in the following also with respect to further advantages and features with reference to exemplary embodiments and the enclosed drawing. The Figures of the drawing show in:

FIG. 1 a schematic representation of a code reader;

FIG. 2 a representation of an exemplary 2D code with a sampling pattern adapted to its distortions;

FIG. 3 a flowchart of how an adjusted sampling pattern grows iteratively from a finder pattern over the entire code;

FIG. 4 a flow chart of the adaptation of the sampling pattern within the respective iterations according to FIG. 3;

FIG. 5 an exemplary representation of magnitude image and gradient image for a code region;

FIG. 6 an enlargement to FIG. 5 on individual code modules; and

Figure 7:
Figure 7:
Figure 7:
Figure 7:
Figure 7:

FIG. 7 an exemplary representation of growing sampling patterns after different iterations of the flow according to FIG. 3.

FIG. 1 shows an optoelectronic code reader 10 for reading a purely exemplary code 12. The code reader 10 uses an image sensor 14 to acquire image data including the code 12, which are further processed by a control and evaluation unit 16 using image processing and decoding methods. The specific imaging method is not important for the invention, so that the code reader 10 can be configured and used according to any principle known per se. The code 12 can be acquired in a single image. In the case of a relative movement between code reader 10 and code 12, the acquisition of only one line at a time is also conceivable, whether by means of a line-shaped image sensor or a scanning method, where in the latter case a simple light receiver such as a photodiode is sufficient as image sensor 14. The lines are combined to form an image. In a preferred application situation, the relative movement is generated by mounting the code reader 10 on a conveyor belt that conveys the objects with their codes 12 through the reading area of the code reader 10.

The goal of the image processing of the control and evaluation unit 16 is to detect code regions and to read out the codes 12 that are arranged in that code regions. The invention is about a partial step generating a sampling pattern of sampling points that adapts to the distortions of the codes 12 caused by deviations from a flat background. The method of generating such a sampling pattern is explained later with reference to FIGS. 2 to 7. The actual code reading, i.e. the decoding based on the image data at the sampling points of the sampling pattern, is known per se and will not be explained in detail.

However, these known decoding methods, apart from general error correction methods, cannot cope with the distortions of code 12.

The code reader outputs 10 information, such as read codes or image data, via interface 18. It is also possible that the control and evaluation unit 16 is not located in the code reader 10, but is connected as a separate control device to one or more code readers 10. In that case, the interface 18 also serves as a connection between internal and external control and evaluation. The control and evaluation functionality can be distributed to internal and external modules in virtually any way, and the external modules can also be connected via network or cloud. No further distinction is made here, and the control and evaluation unit 16 is regarded as part of the code reader 10, irrespective of the actual implementation.

The shown examples of codes 12 are QR Codes. However, the invention is not limited to these codes, but is also applicable to other 2D codes, such as DataMatrix codes, MaxiCodes or Aztec codes. QR codes in a way are even particularly demanding, because they do not have framing finder patterns like DataMatrix codes, which already allow some conclusions about deformations. In principle, barcodes would also be readable according to the invention. However, barcodes are already much more tolerant of the distortions discussed here, since it is sufficient to find a single reading line across the code that still intersects all code modules.

FIG. 2 shows an example of the result of the method for finding a sampling pattern of sampling points adapted to the deformations of a code 12 that now will be described. The sampling pattern follows the curvatures and deformations, preferably by placing exactly one sampling point in the center of each code module. As an illustrative explanation, this is like having a regular grid on a flexible base, which is placed on top of the distorted code 12 and nestles against the code's 12 unevenness.

FIGS. 3 and 4 show an exemplary flow to achieve this result. With this flow, the sampling pattern is generated from the image data iteratively and locally in a kind of self-organized, constructive growth, starting with a small area. FIG. 4 shows a partial flow explaining one step of the flow in FIG. 3 in detail. FIGS. 5 to 7 illustrate various stages of the flow.

Initially, the image data including code 12 are acquired in a step S1. This input data is transferred, for example, as image data together with four corner points to a code region (ROI, Region of Interest) detected by preprocessing. The number of lines and columns for the sampling pattern that is to be determined can be predefined. Alternatively, these parameters can be estimated, or they are found in the course of forming the sampling pattern.

In a step S2 a gradient image and a magnitude image of the code region are calculated. The gradient is the first derivative of the bright-dark pattern of the image data in the code region. The gradient is a vector field, which is decomposed into direction and magnitude. The direction is stored in dependence on the respective X, Y position in the gradient (direction) image, the magnitude in the magnitude image. The direction may have more than one component so that there is more than one gradient (direction) image, for example, there is a gradient X (direction) image and a gradient Y (direction) image. Coordinates other than Cartesian coordinates are possible. FIG. 5 shows an example. The four images are, from top left in clockwise direction, the initial image of the code region, the magnitude image, the gradient image in X direction, and the gradient image in Y direction.

In a step S3 a small initial sampling pattern is generated. This preferably is done for the region of a finder pattern. Finder patterns in the exemplary codes 12 shown in the Figures are the three rectangles at the corners nested inside one another. In a QR Code, a finder pattern consists of 7×7 code modules, so that a 7×7 sampling pattern can be used. Since there is no information about the curvature of code 12 in the region of the finder pattern, the initial sampling pattern is still regular. The size of the finder pattern can also be used for an estimation of the module size. If no required number of columns and rows for the sampling pattern was specified in step S1, this can be determined from the module size and the distance between the finder patterns.

In a step S4, the current sampling pattern, i.e. at this stage the initial sampling pattern, is adapted to the curvatures of code 12. This step is shown again in detail in FIG. 4. The goal of the adaptation can be described as centering the sampling points in the respective module they represent. In the case of a planar code, this could be achieved with a regular grid for all sampling points at the same time. In the case of a code 12 on a deformed background, the sampling pattern is adapted to the curvature by individual shifts or displacements.

First, in a step S41, a shift matrix is generated, which contains respective shifts for the sampling points to be adapted. Initially the values are zero, since no shifts have been determined yet.

The subsequent steps are performed for several, preferably all, sampling points of the sampling pattern, but are only described representatively for one sampling point. In a step S42 it is checked whether the respective sampling point is already centered. An advantageous criterion for this is a check of the corresponding value in the magnitude image. If the magnitude has a value of zero or very close to zero, the sampling point is located in a local extremum of brightness. In the end, it is important that the sampling points represent a module and no edges between modules, a mathematically exact geometrical adaptation is not required. Hence, if a plurality of neighboring points in the magnitude image have zero or near zero value, the end result is not affected if a shift is chosen that leads to one of these points that is not actually in the exact center of the code module.

For sampling points that are not yet sufficiently centered, a shift in the direction of the local extremum or center of their code module is determined in a step S43. This is illustrated in FIG. 6 that is arranged as in FIG. 5. What is shown are enlarged regions of the magnitude and gradient images of FIG. 5 in a vicinity of the code module under consideration. A bright circular point indicates the current position of the sampling point, a bright rectangular point indicates the target position at the local extremum. The direction of the shift in X and Y direction results from the corresponding gradient image, the sampling point follows the largest increase or decrease of brightness. The individual step length of the shift is intentionally chosen small, so that the sampling point does not easily leave the code module.

In a step S44 it is checked whether the sampling point would leave the code module due to previous shifts. This could in particular happen by several small steps, if several light or dark code modules are next to each other. There would anyway be no shift into an adjacent code module with complementary brightness, because this is in the opposite direction to the gradient. If the sampling point would leave the code module, the search for the local extremum for this sampling point is considered to have failed, and preferably it is not shifted at all, but remains in its initial position, since a deterioration rather than an improvement is to be expected from the previous shifts. Otherwise, the search for the local extremum is continued in step S42. There, it is checked whether the preceding shift already succeeded in reaching the local extremum, and if not, there is another small shift in step 43.

Once the loop of steps S42 to S44 is finished for all sampling points, the shift matrix is filled with values that shift a part of the sampling points to the respective local extremum and do not shift the remaining part at all because the search for a local extremum failed. In a step S45, the shift matrix is smoothed, in particular with a Gaussian filter. This does not only lead to a more homogenous grid, but also ensures that those sampling points where no individual shift could be determined are also shifted based on their neighborhood.

After the shifts of the shift matrix have been applied to the current sampling pattern, a step S46 checks if there are any significant shifts beyond a minimum threshold. If this is no longer the case and the sampling points are not moved, convergence is assumed and the adaptation is completed in a step S47. Otherwise, the shift is repeated iteratively in step S41. As an alternative abort criterion a maximum number of iterations can be set, including only one iteration.

Back to FIG. 3, the adaptation step S4 is completed. Now, in step S5, it is checked whether the adapted sampling pattern already covers the code. The required size of the sampling pattern has been specified in step S1 or determined by estimations based on the module size or position and distance of finder pattern itself. As long as the code is not covered, the sampling pattern is iteratively extended in a step S6, and the adaptation is repeated from step S4 on for the entire sampling pattern, for the newly added sampling points, or for the newly added sampling points and some older sampling points, in particular from the neighborhood of the extension.

FIG. 7 illustrates how the pattern grows with the iterations according to step S6. The top left shows the initial situation, where only the finder pattern is covered by the sampling pattern. In the upper right and in the middle left, a row and a column each are added after the first and second iteration. The extension is initially done, for example, by adding sampling points at a distance of the estimated module size. The estimation of the module size can continuously be improved based on the existing sampling pattern. For example, a new sampling point is added at the same distance that neighboring sampling points have that already have been adapted, or according to an average value in row or column direction of the corresponding row or column. An adaptation to the curvature is only made afterwards by the subsequent step S4.

In the middle right of FIG. 7 the seventh iteration is shown as an arbitrary chosen step. On the bottom, the complete sampling pattern is shown. This corresponds to FIG. 2.

Using the image data at the sampling points of the adapted sampling pattern, reading attempts for decoding code 12 will follow in a step S7. If successful, the goal is accomplished. Otherwise, further decoders can be tried. In case of a QR Code with several finder patterns, the entire method can be repeated with another finder pattern. Additional attempts of this kind are particularly useful in case of strong deformations to further increase the reading rate.

Other 2D code types use other finder patterns. In a DataMatrix code, the L-pattern can grow from one or both edges. A Maxi or Aztec code has a central finder pattern, which can be used as a starting point. If, as in these examples, there is only one finder pattern, several attempts to form a sampling pattern are still conceivable. For this purpose, another region, which is not a finder pattern, is used as start region, in particular a region where the code modules are already reliably detected, either from previous reading attempts or because the code 12 is mostly flat in that region.

It should also be noted that a first read attempt can be made at the very beginning before adapting a sampling pattern. It may be possible to that code 12 can already be decoded, in particular if the Code 12 to be processed is not distorted or only slightly distorted.

The invention claimed is:

1. A method for reading optical codes (12) with distortions caused by an uneven background of the optical codes (12), the method comprising the steps of:
    acquiring image data including at least one optical code (12);
    locating a region including the at least one optical code (12) in the image data; and
    reading the code content of the at least one optical code (12) from image data in the region,
    wherein the at least one optical code (12) is read from the image data at sampling points arranged in a sampling pattern corresponding to the distortions, and
    wherein the sampling pattern adapts locally to the distortions caused by the uneven background, the sampling pattern being at least approximately as distorted as the at least one optical code (12).

2. The method according to claim 1,
    wherein the at least one optical code (12) is 2D codes.

3. The method according to claim 1,
    wherein the sampling pattern is determined without knowledge of the curvature of the uneven background.

4. The method according to claim 1,
    wherein at least one of a module size of the at least one optical code (12) and a size of the required sampling pattern is determined from a finder pattern.

5. The method according to claim 1,
    wherein the sampling pattern comprises only one sampling point per module of the at least one optical code (12).

6. The method according to claim 1,
    wherein the sampling pattern is iteratively grown starting from a finder pattern until it covers the at least one optical code (12).

7. The method according to claim 6,
    wherein, initially, sampling points of the sampling pattern are defined for the finder pattern.

8. The method according to claim 1,
    wherein the sampling points are initially defined still in regular arrangement according to a flat background.

9. The method according to claim 1,
    wherein the sampling points are shifted towards the center of the module they represent.

10. The method according to claim 1,
    wherein a gradient image and a magnitude image of the at least one optical code (12) are calculated to determine whether a respective sampling point is located in a local extremum on the basis of the magnitude image and to determine the direction of any remaining displacement from the local extremum from the gradient image.

11. The method according to claim 1,
    wherein sampling points are shifted in steps smaller than a module size until
    a local extremum is reached,
    the shift would lead out of a module,
    or a maximum number of steps has been reached.

12. The method according to claim 11,
    where a respective sampling point is not shifted if no local extremum could be found.

13. The method according to claim 1,
    wherein a shift matrix of shifts of the respective sampling points towards a local extremum is smoothed.

14. The method according to claim 13,
    wherein the shift matrix is smoothed with a Gaussian filter.

15. The method according to claim 1,
    wherein a new shift matrix with shifts of sampling points towards a local extremum is determined iteratively and applied to the sampling pattern until a further shift matrix does not cause any more shifts above a tolerance threshold or until a maximum number of iterations is reached.

16. The method according to claim 1,
    wherein the sampling pattern is iteratively grown at at least one edge with additional sampling points until it at least one of covers the at least one optical code (12) and reaches a predetermined size.

17. The method according to claim 1,
    where a further sampling pattern is determined starting from another finder pattern.

18. A code reading apparatus (10) for reading optical codes (12) with distortions caused by an uneven background of the optical codes (12), the code reading device (10) comprising an image sensor (14) for acquiring image data including at least one optical code (12) and a control and evaluation unit (16) which is configured to:
    locate a region including the code in the image data and to read the code content of the at least one optical code (12) from image data in the region at sampling points arranged in a sampling pattern corresponding to the distortions,
    wherein the sampling pattern adapts locally to the distortions caused by the uneven background, the sampling pattern being at least approximately as distorted as the at least one optical code (12).

19. The method according to claim 18,
    wherein the at least one optical code (12) is 2D code.

* * * * *